May 18, 1954  E. H. LUSEBRINK  2,679,009
CASSETTE
Filed May 24, 1952  2 Sheets-Sheet 1
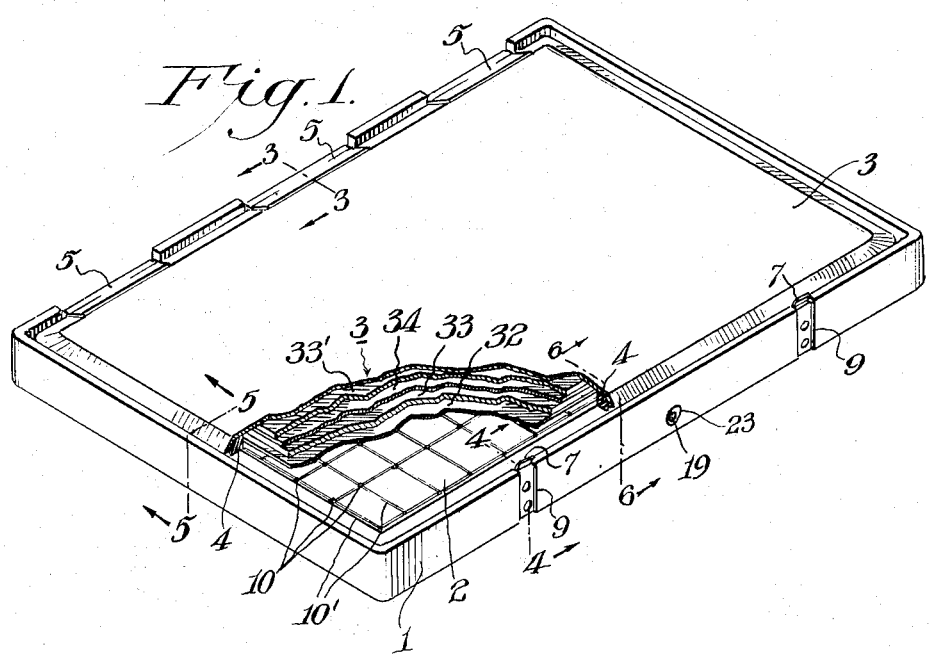
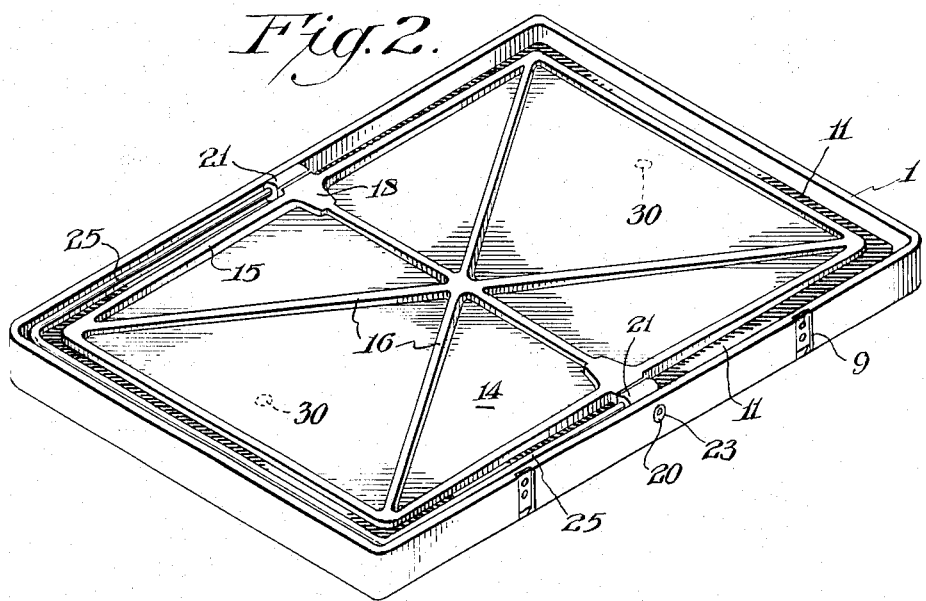
INVENTOR:
Elmer Henry Lusebrink
BY
Lynn Barratt Morris
ATTORNEY.

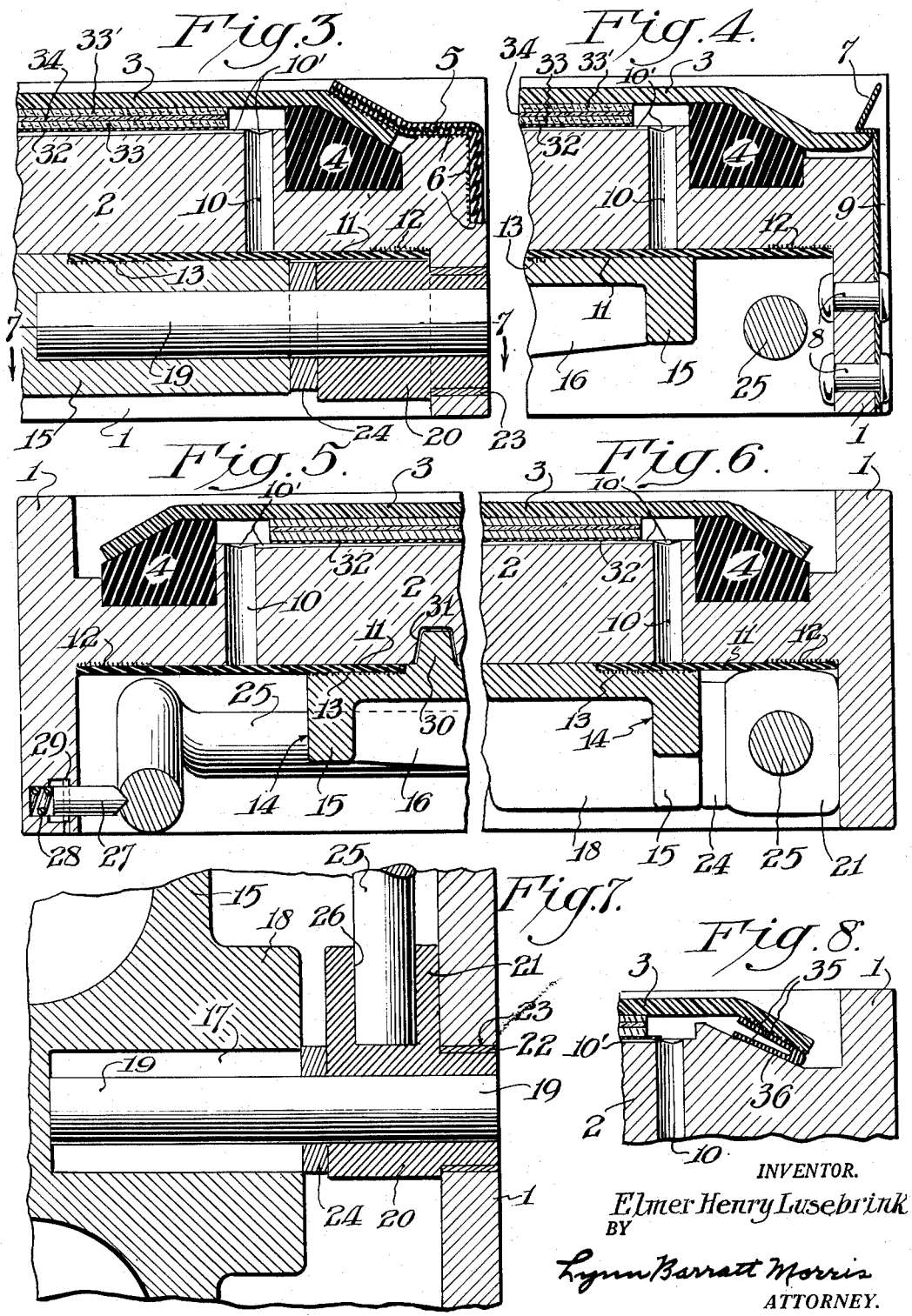

Patented May 18, 1954

2,679,009

UNITED STATES PATENT OFFICE 2,679,009

CASSETTE

Elmer Henry Lusebrink, Matawan, N. J., assignor to E. I. du Pont de Nemours and Company, Wilmington, Del., a corporation of Delaware Application May 24, 1952, Serial No. 289,721

10 Claims. (Cl. 250—68)

This invention pertains to a cassette and more particularly to a vacuum cassette. Still more particularly it pertains to an X-ray cassette which has a movable plate attached to a diaphragm which will produce a vacuum without the use of external pumps or vacuum sources and thereby provide uniform contact between an X-ray intensifying screen or pair of such screens and an X-ray-sensitive film element.

Different types of cassettes have been proposed for use in the photographic art as well as the art of making radiographs or X-ray photographs. Many of these cassettes are quite complicated and are expensive to build and are rather bulky. The X-ray cassettes which find wide spread use generally consist of a light-proof, shallow box with a hinged or removable back. The front of the cassette is generally thin and made of metal or plastic material that is not absorptive of X-rays. These cassettes usually have a felt pad or lining on the inside of the removable back and are provided with latch-type springs in order to provide firm contact between the X-ray intensifying screen or screens and the light-sensitive film element. The cassettes generally have a rugged construction since they are rather heavy and are handled roughly during their use. The conventional cassettes have the disadvantage that the front plate and sometimes the frame and back become warped and/or the felt backing becomes compacted or worn whereby good uniform contact between X-ray intensifying screen and film cannot be maintained.

Cassettes have been made with pneumatic bags which are usually placed between the front and/or back plates and the assembled X-ray intensifying screens and film element. These bags have the disadvantage that they are susceptible to being ruptured due to improper handling and often tear loose and buckle whereby nonuniform contact results.

An object of this invention is to provide an improved type of film holder. A further object of this invention is to provide an improved type of X-ray cassette. A further object is to provide an improved cassette which will maintain uniform contact between an X-ray intensifying screen and an X-ray-sensitive film element over a reasonably long period of time. Another object is to provide such a cassette which is light in weight but rugged in construction. A further object is to provide such a cassette which is simple in construction and easy to operate. Still other objects will be apparent from the following description of the invention.

The novel X-ray cassettes of this invention will now be described with reference to the accompanying drawings which form a part of this specification. In these drawings which illustrate practical embodiments of the invention:

Fig. 1 is a perspective view of the top of the cassette of this invention with the cover and contents shown in an enlarged broken section;

Fig. 2 is a perspective view of the bottom of the cassette with the diaphragm plate in contracted position;

Fig. 3 is an enlarged section taken along the line 3—3 of Fig. 1;

Fig. 4 is an enlarged section taken along the line 4—4 of Fig. 1;

Fig. 5 is an enlarged section taken along the line 5—5 of Fig. 1;

Fig. 6 is an enlarged section taken along the line 6—6 of Fig. 1;

Fig. 7 is an enlarged section taken along the line 7—7 of Fig. 3 with parts in plain view; and Fig. 8 is an enlarged section of a modified lid and gasket construction.

Referring now to the drawings wherein the same reference numerals refer to the same parts throughout the several views the novel cassette consists of a rectangular frame 1 consisting of side walls and end walls and a horizontal perforated grid 2 disposed between the walls so as to form an upper chamber for the reception of an X-ray intensifying screen or screens and at least one light-sensitive film element and if desired a backing sheet, e. g., lead which is capable of absorbing X-rays and a lower chamber which encloses a movable diaphragm and an actuating mechanism for said diaphragm.

The grid and the side walls are preferably of an integral construction but may be made in several parts which can be welded or otherwise joined together by means of bolts, screws, pins, etc. The frame and grid are preferably constructed of a light weight metal, e. g., aluminum or aluminum alloy and the thicknesses of the walls and grid should be of such dimensions that the frame is of a rugged construction and will not warp severely or bend when the cassette is actuated or become deformed in handling.

A deflectible cover 3 which coacts with a resilient gasket 4 for the upper chamber is hinged to the frame by means of hinges 5. These hinges as shown more particularly in Fig. 3 consist of a rubber fabric which is joined to the frame by means of a suitable adhesive. The invention, however, is not limited to the use of fabric hinges as metal or plastic hinges can be used and affixed to the frame and cover by welded joints or by means of screws, pins, bolts or rivets, etc. It will be noted that the hinges are disposed in recesses 6 to prevent undue wear or abrasion during handling. Thus, in sliding the cassette into an X-ray table or holder and in loading and unloading, the flexible hinges are protected.

The cover member may be held in closed position by means of spring clips 7 which are fastened to the frame by means of rivets 8. These clips are disposed in recesses 9 similar to the hinges in order to prevent wear or damage during handling. While only two spring clips are shown additional ones can be added in order to insure a proper light- and air-sealing closure of the cover. Thus, spring clips can be placed on the two end walls of the cassette if desired. The invention is not limited to the use of spring clips as other suitable fastening devices can be used, e. g., spring clamps, spring actuated detents, etc.

The upper surface of the horizontal grid is provided with a plurality of small holes 10 which extend clear through the grid thus establishing air communication between the upper chamber and a chamber below the grid. The holes are preferably spaced in a somewhat uniform pattern and preferably each hole is joined to adjacent holes by means of small grooves 10'.

In the chamber below the grid there is disposed a diaphragm 11 which consists of a flexible sheet, also designated 11, and a diaphragm plate 14. The diaphragm is affixed to the frame or grid by any suitable means, e. g., by an adhesive area 12 and to the plate by a similar adhesive area 13. The diaphragm plate is preferably composed of a metal which has considerable rigidity so that it will not flex or bend. As shown, it is provided with a stiffening peripheral rib 15 and radially disposed ribs 16. Cam slots 17 are provided near the center of opposite walls of the plates in an enlarged rib area 18. These cam slots are more fully shown in Fig. 7 and are adapted to receive a pin or projection 19 which is eccentric with respect to crank shafts 20 which have a crank arm portion 21 and the ends of the shafts are preferably disposed in shaft bearings 22 that are journaled in bearing recesses 23 in the side walls of the frame. Washers 24 are disposed between the crank shaft and the enlarged rib portions of the plate in order to prevent wear and to aid in assembling the cassette.

A U-shaped yoke 25 is fastened to the crank arms and fits in a recess between the side and end walls of the diaphragm plate and the side and end walls of the frame. As shown in Fig. 2 and more clearly in Fig. 7, the ends of the yoke are fitted into coacting holes 26 in the crank arms. The yoke may be forced-fitted into the crank arms or welded or otherwise affixed by means of set screws or may be threaded into the recesses.

As shown in Fig. 5 there is provided a detent 27 which is pressed by spring 28 to engage with the end of the yoke. This detent is provided with a retaining pin 29 to prevent it from being ejected completely. It is obvious that various other holding means can be provided for retaining the yoke arm in position.

The yoke, crank shaft and eccentric pins are so adapted that when the yoke is swung through an angle of 180° the diaphragm, that is, the diaphragm plate, moves from its contracted position against the lower surface of the grid to a distended position a short distance below the lower surface of the grid.

In order to prevent wobbling or sliding of the diaphragm plate it is advisable to have a truncated cone projection 30 on the upper surface of the diaphragm plate which will fit into a similarly shaped recess 31 in the bottom surface of the grid. However, in place of the projection and recess there may be used a small boss or bumper made of rubber or a natural or synthetic elastomeric material.

The upper rectangular chamber of the cassette is adapted to receive a sheet of X-ray absorbing material, e. g., a thin sheet of lead 32 on which there is disposed an X-ray intensifying screen 33. A sheet of light-sensitive X-ray film which generally has a light-sensitive emulsion layer on each surface is placed on the lower X-ray intensifying screen and a second X-ray intensifying screen 33' is disposed above the sheet of light-sensitive film 34. The upper X-ray intensifying screen may be glued or otherwise affixed to the inside of the cover of the cassette for ease in use. Similarly, the lower X-ray intensifying screen may be adhesively joined to the sheet of X-ray adsorbing material. This will then enable one to merely open the cassette and insert the film element in proper position on the lower X-ray intensifying screen. While the film screens and lead foil are shown in Figs. 1, 3, 4, and 5 as being of approximately the same area, in actual practice the screens are generally somewhat larger than the film elements and overlap them.

Referring now to the cover 3, it will be noted that it has a bevelled edge all around its periphery. This bevel contacts a gasket material which likewise extends around the entire grid and is spaced a short distance from the inner side walls. The gasket is made from a deformable material, e. g., rubber or other synthetic or natural elastomeric material. It can be molded in various shapes and sizes and may have a hollow central portion with an inner radial slot in order to be more yielding.

In Fig. 8 there is shown an alternative form of construction wherein a folded rubber gasket material 35 is glued to the inner surface of the bevelled portion of the cover. The outer bottom surface contacts with a bevelled portion 36 of the horizontal grid.

In operating the novel cassette the yoke arm 25 is swung to one of its innermost positions so that the diaphragm and diaphragm plate will be in contracted position and contacting or nearest to the bottom of the grid. The cover member is then lifted and a sheet of light-sensitive X-ray film element inserted onto the upper surface of the X-ray intensifying screen 33 which is, in turn, mounted on a sheet of lead foil 32. The later sheet, as stated above, can be eliminated when X-ray exposures are made with apparatus which has an integrating exposure meter to control the duration of exposure. In such equipment a fluorescent surface and a photocell is located behind the cassette and X-rays passing through the cassette energize the screen which in turn actuates the photocell, after sufficient exposure, to terminate the X-ray exposure. In such equipment, the lead backing sheet must be provided with windows or removed entirely. The latter two sheets are generally left in the cassette. The upper intensifying screen 33 which is preferably adhesively joined to the cover presses against the film element when the cover is closed. The cover is locked into position by means of spring clips 7 or other suitable locking devices. The yoke arm 25 is then swung through an angle of 180° and locked into closed position by means of spring pressed detent 27 or other suitable means. When in the latter position, the diaphragm and diaphragm plate are in a distended position being at the maximum distance from the grid. This reduces the air pressure in the chamber above the grid as well as below the grid and between the diaphragm and bottom of the grid. The air pressure being greater on the outside of the cassette presses against the entire area of the cover causing it to flex slightly and press the entire assembly into firm contact with the grid. Thus, the X-ray intensifying screens are pressed into firm contact with the X-ray film surfaces providing uniform contact throughout the entire screen surface area and the adjacent emulsion surface of the film.

By providing the surface of the grid with channels 10' between the holes 10, the air is more readily removed from above the surface of the grid to the diaphragm chamber below the grid.

While in Fig. 1 rectangular patterns of holes and channels are shown, it is obvious that various other patterns can be used. While the holes are preferably uniformly spaced throughout the entire area of the grid, this is not essential as the holes may be more closely spaced near the edges or near the center.

For use as an X-ray cassette the cover member can be made of any material which transmits X-rays but does not transmit light rays. It generally should be sufficiently thick so that it cannot be readily bent or ruptured during handling, but must not be so thick so that it will not flex under atmospheric pressure when the diaphragm is moved from the contracted to the distended position. It may be composed of aluminum, magnesium or other metal or synthetic resin or superpolymer or such materials which contain fibers in order to give greater strength. The cover may also be composed of a sheet of a fabric impregnated and coated with a resin or superpolymer, e. g., a phenol-formaldehyde resin. Suitable additional materials include hard rubber, pigmented or opaque plastics, e. g., tetrafluoroethylene, superpolyesters, e. g., polyethylene terephthalate, superpolyamides (nylon), vinyl resins, e. g., polyvinyl chloride, polyvinyl acetate, polyacrylic acid, e. g., polymerized methyl methacrylate, ethyl acrylate, etc., polystyrene, etc.

The cover may be in the form of a single molded, pressed or cast sheet of deflectable material as shown and described above or it may consist of relatively narrow rectangular frame and a sheet having an area commensurate in size with the X-ray intensifying screen and film. The bottom surface of the frame may be bevelled to coact with a bevelled gasket as shown or may be flat or concave to contact with a flat or rounded gasket.

In the case of any of the cover constructions just mentioned the deflectible central portion can be made of rubber or an equivalent elastomeric polymer which is colored with suitable pigments, e. g., carbon black, lamp black, etc., so that it will not transmit light rays.

When a wooden or metal, etc., frame is used for the cover, cross-sectional dimensions of about ¼ inch by ½ inch are satisfactory. The deflectible rubber, etc., sheet can even be disposed below the frame and thus will aid in forming an air-tight and light-tight seal. In such a cover construction the upper walls of frame 1 can be eliminated and the rectangular frame of the cover coextensive with the remaining walls of the body. However, it is preferable to have the cover nest or interfit within the side walls of the frame so that it will be protected.

The flexible diaphragm 11 instead of being adhesively joined to the frame and grid as shown can be attached to these members in various ways thus the side and end walls below the grid 2 can be made in the form of a rectangular frame and the diaphragm made larger and clamped between this frame and the remaining grid body. This frame can be screwed to the body. The upper surface of the grid is preferably flat but can be curved.

Similarly, a narrow metal or plastic strip may be placed below the adhesive area and spaced screws passed through holes in the strip and flexible diaphragm aid in holding the latter to the grid. The flexible diaphragm may be similarly attached to the diaphragm plate 14. Indeed, it may cover the entire area of the plate and be clamped to it by means of another thin plate of similar area by means of bolts or screws in place of or in addition to an adhesive. However, the present diisocyanate rubber adhesives are sufficient to give adequate bonds which will give many years of service. Suitable adhesives are described in U. S. Patents 2,381,186, 2,356,005, Fiat Final Report No. 1301, entitled "Supplemental Report on Applications of Diisocyanates," published by Joint Intelligence Objectives Agency, Washington, D. C.

It will be apparent from the above that the essential features of applicant's cassette are a perforated and grooved grid which is adapted to hold a light-sensitive film element and other cooperating sheets, e. g., X-ray absorbing sheet, and an X-ray intensifying screen or screens, an interfitting deflectible cover member (preferably hinged), a light-tight and air-tight seal between the cover and grid and a lever-operated diaphragm below the grid whereby a volumetric displacement of air in cassette is obtained thus causing the cover to deflect inwardly and exert pressure on the sheet contents.

Air pressures of 0.18 to 0.65 pound per square inch and more forcing the X-ray screens into contact with the film can be obtained by the cassettes described above. The X-ray pictures should ordinarily be taken a few seconds after the diaphragm is actuated from contracted to distended position but the vacuum is effective after longer periods, for instance from 5 to 10 minutes depending on the particular constructions or effectiveness of the seals.

By making the cover of light-transmitting material, e. g., polyvinyl chloride, cellulose acetate, nylon, etc., the cassettes can be used as printing frames for pressing a negative transparency into contact with a light-sensitive film element. In this case the cassettes would be loaded in a darkroom and exposed to light after actuating the diaphragm.

The cassette of this invention is simple and effective. It can be readily operated by the ordinary technician by reading simple instructions. It is rugged and can be used for many years without any necessity for repairs or adjustments. The mechanism is simple and self-contained and does not rely on outside sources of power, viz., vacuum pumps.

An additional advantage is that the cassette can be made to be light in weight. A further advantage is that the cassettes provide good and uniform contact between an X-ray intensifying screen or screens and the entire surface or surfaces of an X-ray film element thus insuring good detail over the entire picture and eliminating fuzzy details. Another advantage is that successive exposures result in uniform pictures. Still other advantages will be apparent from the above description.

As many widely different embodiments of this invention can be made without departing from the spirit and scope thereof, it is to be understood that the invention is not to be limited except as defined by the claims.

What is claimed is:

1. A self-contained, vacuum-actuated cassette comprising a frame, a horizontal perforated grid, a chamber above the grid which is adapted to receive a light-sensitive film element, a radiation transmitting deflectible cover for said chamber, a resilient sealing gasket between said grid and said cover, a movable diaphragm below said grid and lever means for moving said diaphragm to and from contracted and distended positions, to reduce the air pressure above the grid.

2. A self-contained, vacuum-actuated cassette comprising a frame, a horizontal perforated grid, a chamber above the grid which is adapted to receive a light-sensitive film element, an X-ray transmitting deflectible cover for said chamber, a resilient sealing gasket between said grid and said cover, a movable diaphragm below said grid and lever means for moving said diaphragm to and from contracted and distended positions, to reduce air pressure above the grid.

3. A self-contained, vacuum-actuated, light-proof cassette comprising a frame consisting of side and end walls and a horizontal perforated grid that forms shallow upper and lower chambers with said walls, the upper chamber being adapted to receive an X-ray intensifying screen and a light-sensitive film element, a deflectible cover, which transmits X-rays, for enclosing such screen and element in said upper chamber, a sealing gasket between the cover and grid, a movable diaphragm below said grid, said diaphragm forming an exhaustion chamber below said grid, and lever means on said frame to move said diaphragm to and from contracted and distended positions, to reduce the air pressure above the grid.

4. A self-contained, vacuum-actuated cassette comprising a rectangular frame consisting of side and end walls and a horizontal perforated grid that forms a shallow upper and lower rectangular chamber with said walls, the upper chamber being adapted to receive photographic film elements, a deflectible cover, which transmits light rays, for enclosing said element in said upper chamber, a movable diaphragm below said grid consisting of a movable plate and a flexible sheet that is attached to said frame, said diaphragm forming an exhaustion chamber below said grid, a yoke journalled in said frame with a member engaging said plate and adapted to move said diaphragm from contracted to distended position and means for holding the yoke in closed position.

5. A self-contained, vacuum-actuated, light-proof cassette comprising a rectangular frame consisting of side and end walls and a horizontal perforated grid that form shallow upper and lower rectangular chambers with said walls, the upper chamber being adapted to receive an X-ray intensifying screen and a light-sensitive film element, a deflectible cover, which transmits X-rays, for enclosing such screen and element in said upper chamber, a movable diaphragm below said grid consisting of a movable plate and a flexible sheet that is attached to said frame, said diaphragm forming an exhaustion chamber below said grid, a yoke journaled in said frame with a member engaging said plate and adapted to move said diaphragm from contracted to distended position and means for holding the yoke in closed position.

6. A vacuum-actuated, light-proof cassette comprising a rectangular frame consisting of side and end walls and a horizontal, perforated grid that forms a shallow upper and lower rectangular chamber with said walls, the upper chamber being adapted to receive an X-ray intensifying screen and a light-sensitive film element, a deflectible cover, which transmits X-rays, for enclosing such screen and element in said upper chamber, a movable diaphragm below said grid consisting of movable plate and a flexible sheet that is attached to said frame, said diaphragm forming an exhaustion chamber below said grid, a yoke surrounding said plate, which interfits in the lower chamber, having a crank shaft on each end journaled in the adjacent wall, an eccentric pin extending inwardly from each said shaft and engaging said plate, so that when said yoke is moved from one position to another said diaphragm moves from a contracted to a distended position.

7. A vacuum-actuated, light-proof cassette comprising a rectangular frame consisting of side and end walls and a grid that forms a shallow upper and a lower rectangular chamber with said walls, the upper chamber being adapted to receive a sheet of X-ray absorbing material, X-ray intensifying screens and light-sensitive film elements, said grid having a plurality of uniformly spaced holes of narrow cross-section establishing communication above and below the grid and having channels of narrow cross-section on the surface of said grid connecting each hole with at least one adjacent hole, a thin deflectible light-proof, hinged cover, which transmits X-rays, for enclosing said such screens and elements in said chamber, interfitting between said walls, a deformable sealing gasket between said grid and cover and attached to at least one of said latter members, a movable diaphragm below said grid consisting of a movable plate and a flexible sheet that is attached to said frame, said diaphragm forming an exhaustion chamber below said grid, a U-shaped yoke arm below said flexible sheet and surrounding said movable plate, each end of the arm having a crank shaft journalled in the side wall near its center, an eccentric pin extending inwardly from each crank shaft and engaging a recess in the adjacent side of said plate so that when said yoke is moved from one position to another said diaphragm moves from contracted to distended position and reduces the air pressure in the closed upper chamber thereby forcing said cover in to firm contact with an enclosed X-ray screen and light-sensitive film element pressing them against said grid.

8. A cassette as defined in claim 7 wherein said cover is composed of a laminated resin material and said frame is composed of metal.

9. A vacuum-actuated cassette comprising a rectangular frame consisting of side and end walls and a grid that forms a shallow upper and lower rectangular chamber with said walls, the upper chamber being adapted to receive photographic elements, said grid having a plurality of uniformly spaced holes of narrow cross section establishing communication above and below the grid and having channels of narrow cross section on its upper surface connecting each hole with at least one adjacent hole, a thin deflectible hinged cover, which transmits light rays, for enclosing said films in said chamber, interfitting between said walls, a deformable sealing gasket between said grid and cover and attached to at least one of said latter members, a movable diaphragm below said grid consisting of a movable plate and a flexible sheet that is attached to said frame, said diaphragm forming an exhaustion chamber below said grid, a U-shaped yoke arm below said flexible sheet and surrounding said movable plate, each end of the arm having a crank shaft journalled in the side wall near its center, an eccentric pin extending inwardly from each crank shaft and engaging a recess in the adjacent side of the said plate, so that when said yoke is moved from one position to another said diaphragm moves from contracted to distended position and reduces the air presure in the closed upper chamber thereby forcing said deflectible cover into firm contact with the photographic elements pressing them against the grid, spring clips for holding the cover in closed position and a spring pressed detent for holding said yoke arm in a closed position.

10. A vacuum-actuated, light-proof cassette comprising a rectangular frame consisting of side and end walls and a grid that forms a shallow upper and a lower rectangular chamber with said walls, the upper chamber being adapted to receive a sheet of X-ray absorbing material, X-ray intensifying screens and light-sensitive film elements, said grid having a plurality of uniformly spaced holes of narrow cross-section establishing communication above and below the grid and having channels of narrow cross-section on the surface of said grid connecting each hole with at least one adjacent hole, a thin deflectible light-proof hinged cover, which transmits X-rays, for enclosing said such screens and elements in said chamber, interfitting between said walls, a deformable sealing gasket between said grid and cover and attached to at least one of said latter members, a movable diaphragm below said grid consisting of a movable plate and a flexible sheet that is attached to said frame, said diaphragm forming an exhaustion chamber below said grid, a U-shaped yoke arm below said flexible sheet and surrounding said movable plate, each end of the arm having a crank shaft journalled in the side wall near its center, an eccentric pin extending inwardly from each crank shaft and engaging a recess in the adjacent side of said plate so that when said yoke is moved from one position to another said diaphragm moves from contracted to distended position and reduces the air pressure in the closed upper chamber thereby forcing said cover into firm contact with an enclosed X-ray screen and light-sensitive film element pressing them against said grid, spring clips for holding said cover in closed position and a spring pressed detent for holding said yoke arm in a closed position.

References Cited in the file of this patent

UNITED STATES PATENTS

| Number | Name | Date |
| --- | --- | --- |
| 1,550,499 | Buck | Aug. 18, 1925 |
| 2,371,843 | Powers | Mar. 20, 1945 |
| 2,381,556 | Powers | Aug. 7, 1945 |

FOREIGN PATENTS

| Number | Country | Date |
| --- | --- | --- |
| 247,173 | Germany | May 22, 1912 |